Jan. 23, 1934.    G. H. BRODIE    1,944,211
METHOD OF AND MEANS FOR TESTING THE ELECTRICAL CHARACTERISTICS OF MATERIALS
Filed Jan. 13, 1931
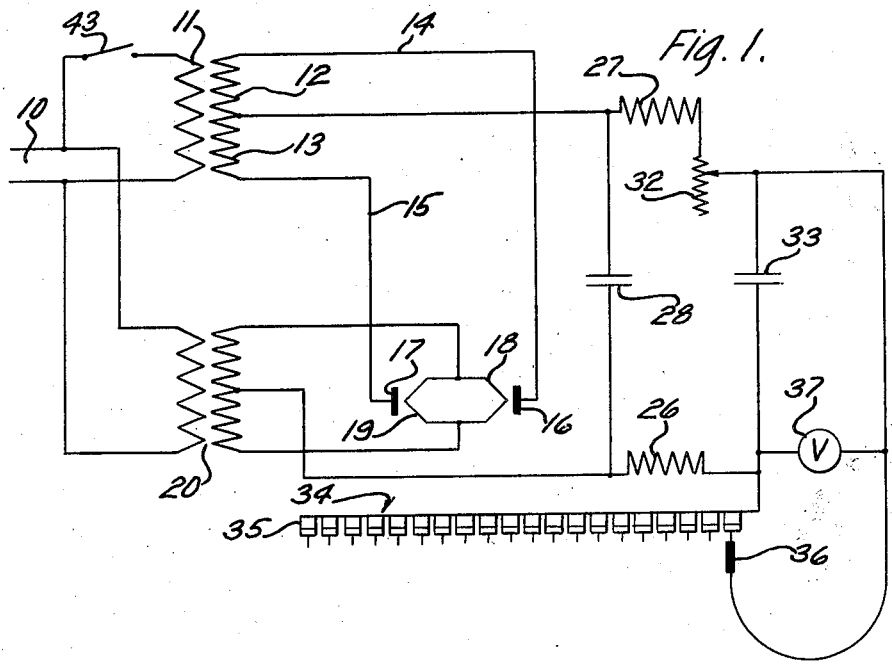
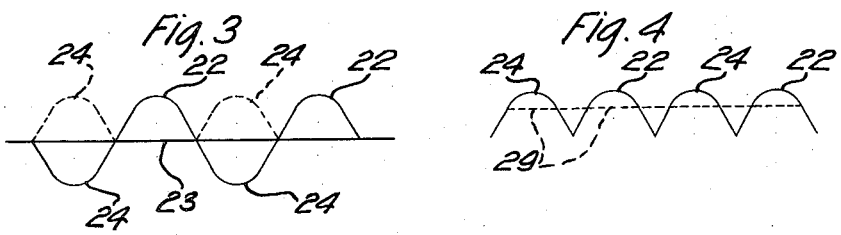
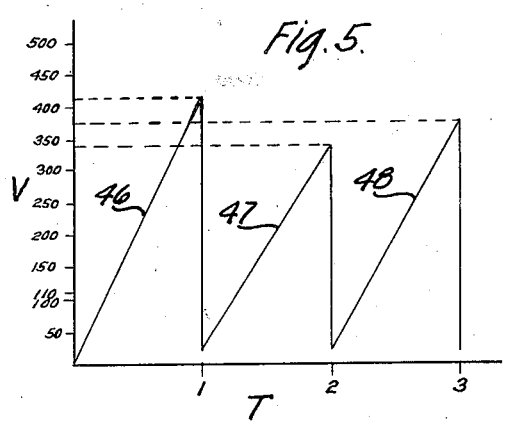
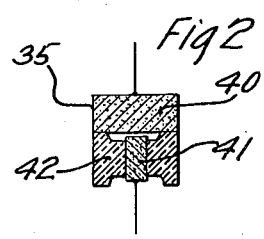
Inventor
G. H. Brodie
By H. B. Whitfield Att'y Patented Jan. 23, 1934

1,944,211

UNITED STATES PATENT OFFICE

1,944,211

METHOD OF AND MEANS FOR TESTING THE ELECTRICAL CHARACTERISTICS OF MATERIALS

George H. Brodie, Riverside, Ill., assignor to Western Electric Company, Incorporated, New York, N. Y., a corporation of New York Application January 13, 1931. Serial No. 508,432

6 Claims. (Cl. 175—183)

This invention relates to a method of and means for testing the electrical characteristics of materials, and more particularly to a method of and means for testing telephone protector block assemblies to determine their voltage breakdown characteristics.

Objects of this invention are to provide a simple, efficient, and practical method of and means for readily and accurately determining the electrical characteristics of electrial apparatus.

In accordance with the objects of the invention, means is provided for testing protector block assemblies consisting of a circuit for an alternating current of predetermined voltage in which the voltage is increased by passing through a step-up transformer, the current is rectified by means of rectifier tubes, and then subjected to the action of a condenser and choke coils arranged in the form of a filter for opposing the passage of currents of certain frequencies. The resulting current trickles through an adjustable resistance to a large condenser, which is connected in parallel with the protector block assembly being tested, the condenser being charged by such current and the same voltage applied to the protector block assembly so that an indicating means, such as a voltmeter connected in parallel with the large condenser and protector block assembly, will indicate the voltage at which the protector block assembly fails or breaks down.

The method of testing the protector block assemblies consists in charging an electrostatic capacity capable of withstanding a high voltage, simultaneously therewith subjecting the protector block assembly to the applied voltage, and indicating the voltage at which a discharge takes place or at which the protector block assembly fails.

The invention will be more fully understood from the following description, taken in conjunction with the appended drawing, in which Fig. 1 is a wiring diagram illustrating the invention;

Fig. 2 is a cross-sectional view of one of the protector block assemblies;

Figs. 3 and 4 are illustrations of the current flow at different stages in the method, and Fig. 5 is a chart illustrating the results of tests made upon a protector block assembly.

Referring now to the drawing wherein like reference numerals designate similar parts throughout the several views, the numeral 10 designates a 110 volt alternating current line. Connected electrically with the line 10 is a step-up transformer 11, having a secondary winding divided into sections 12 and 13 which are capable of delivering a current of a voltage of 550 volts, totaling approximately 1100 volts for the transformer. Positive lead out lines 14 and 15 of the step-up transformer 11 are electrically connected to plate electrodes 16 and 17, respectively, of rectifier tubes, filaments 18 and 19 of which are supplied with an alternating current of approximately 7½ volts through a filament transformer 20 which is electrically connected to the 110 volt alternating current line 10. This constitutes the first two steps of the method; namely, the increasing of the voltage and the rectifying of the current.

The character of the alternating current as impressed on the rectifier tubes is illustrated by the solid curve in Fig. 3. As the alternating current passes through the rectifier tubes the character of the current is changed in that the pulsations will be only in one direction. In illustration of this condition let it be assumed that only one rectifier tube is employed instead of the two as illustrated in Fig. 1. With such an arrangement the pulsations 22, above the horizontal zero line 23, will be spaced apart as shown in Fig. 3. However, by the use of two rectifier tubes both halves of the wave will be rectified and thus produce a curve shown in Fig. 3 above the horizontal line 23 with the solid line portion 22 and the dotted line portion 24.

The rectified current charges a condenser 28 and passes through choke coils 26 and 27, the condenser 28 being preferably of the (4 M. F.) four microfarad type which is adapted to remove the bumps in the current wave and thus tend to produce a current effect as shown in Fig. 4. The solid line portion in Fig. 4 represents the rectified condition of the current flow after passing through the rectifier tubes while the dotted line 29 indicates the essential disappearance of the pulsations after charging the condenser 28, and passing through the choke coils 26 and 27. The choke coils 26 and 27 oppose pulsations in a current flow and, therefore, complete the means for changing the alternating current into a direct current.

A testing circuit, in electrical connection with the circuit supplying the direct current of high voltage, includes an adjustable resistance 32 through which the direct current trickles at a desired rate after passing through the choke coils 26 and 27. In this circuit there is disposed an electrostatic condenser 33 of high capacity and capable of withstanding a high voltage, and connected in parallel with the electrostatic condenser 33 is a unit indicated generally at 34 for receiving a plurality of protector block assemblies 35, in electrical engagement with which a connecting plug 36 may be disposed. The current passing through the resistance 32 charges the condenser 33 and the rate at which the condenser is charged may be varied by adjusting the resistance. An indicating means, such as a voltmeter 37, is electrically connected in parallel with the condenser 33 and the desired protector block assembly 35 for indicating the voltage at which the protector block assembly fails or breaks down when submitted to the test. The protector block assemblies may be of any desired construction, such as shown in Fig. 2 wherein one of the protector blocks indicated at 40 is in electrical connection with one conductor of the test circuit, while the other block indicated at 41 and carried by an insulating member 42 is in electrical connection with the other conductor of the test circuit.

In submitting a protector block assembly to test the plug 36 is connected with the desired assembly and a switch 43 is closed by the operator, allowing the alternating current of 110 volts to pass through the step-up transformer 11, where the voltage will be increased and the alternating current will be rectified by the rectifier tubes. As an illustration let it be assumed that the pulsations 22 pass through the conductor 14 and the pulsations 24 pass through the conductor 15. Consequently, the pulsations 24 will be inverted and will occur in their alternate positions between the pulsations 22. The resulting current wave will then be changed to a substantially direct current by charging the condenser 28 and passing through the choke coils 26 and 27, after which the current will trickle through the resistance 32 and charge the condenser 33 at the rate desired, simultaneously applying the same voltage to the protector block assembly being tested. This voltage is indicated by the voltmeter 37 as the condenser 33 continues to charge and until the protector block assembly being tested breaks down or fails. The operator making the tests, by viewing the voltmeter 37 which indicates the increase in voltage applied to the condenser 33 and the protector block assembly, can determine the voltage at which the protector block assembly fails. After the protector block assembly being tested breaks down or fails, the energy stored in the condenser 33 will escape through the protector block assembly, thus discharging the condenser and indicating the condition by the voltmeter 37. By the operator holding the key switch 43 closed, the condenser 33 will again be charged by the direct current trickling through the adjustable resistance 32 until the protector block assembly again breaks down or fails. By submitting the protector block assembly to a desired number of tests the condition and the electrical qualities of the protector block assembly may be determined.

In Fig. 5 the chart illustrates the results of three tests made upon one protector block assembly. This chart indicates the results by plotting the voltage at which the breakdown occurred in each test against time. In the first test, as represented by the peak of the first line indicated at 46, the protector block assembly broke down, or discharged, at 415 volts, while in the second test, as indicated by the peak of line 47, the protector block assembly broke down at 340 volts, and in the third test, as indicated by the peak of line 48, the protector block assembly broke down at 375 volts. The vertical lines indicate the discharge condition of the condenser, the energy charged up in the condenser 33 having discharged through the protector block assembly. The voltage does not return to zero after the discharge, but to a value approaching zero and too low to permit the discharge to continue.

Even though the protector block assembly discharges at a certain voltage, unless it breaks down completely as when there is a complete ground which might exist by the melting of a means for holding the block 41 at a spaced position relative to the block 40 in the insulating member 42 in which it is disposed, the assembly may be used again, for the reason that the breaking down of the protector block assembly is merely an arcing across between the blocks. This arcing across between the blocks may loosen particles of the material of which the blocks are formed, but unless there is a considerable disturbance of the particles of material the blocks will remain sufficiently spaced to be effective for the purpose intended.

Although the invention has been described in conection with one particular type of article to be tested, it is to be understood that the invention may be applied to different articles composed of different material without departing from the spirit and scope of the invention.

What is claimed is:

1. A method of testing protector block assemblies which consists in charging a large electrostatic capacity, simultaneously therewith subjecting the protector block assembly to the applied voltage, and indicating the voltage at which the protector block assembly is incapable of withstanding the applied voltage.

2. A method of testing protector block assemblies which consists in charging an electrostatic capacity capable of withstanding a high voltage, simultaneously therewith subjecting the protector block assembly to the applied voltage, and indicating the voltage at which the protector block assembly discharges or fails to discharge.

3. In a testing apparatus, an electrical circuit arranged to include a protector block assembly, a condenser connected in said circuit in parallel with the protector block assembly, a source of direct current, means for applying said current to said condenser and a protector block assembly, and means for indicating the voltage applied to said protector block assembly.

4. In a testing apparatus, an electrical circuit arranged to include a protector block assembly, a condenser connected in said circuit in parallel with the protector block assembly, a source of direct current, means for applying said current to said condenser and said protector block assembly, and means for indicating the voltage at which the protector block assembly functions or fails to function.

5. A testing apparatus comprising an electrical circuit for an alternating current of predetermined voltage, means for increasing the voltage of the alternating current, means for converting the alternating current into a direct current, an electrostatic condenser adapted to be charged by the direct current, adjustable means for controlling the flow of direct current to the electrostatic condenser, means for subjecting the protector block to the applied voltage of the electrostatic condenser, and means for indicating the voltage applied to the protector block.

6. A testing apparatus for determining the electrical breakdown point of an electrical unit comprising a source of alternating current, a thermionic tube rectifier for said current, an output circuit for said tube including a condenser, an indicating device in parallel with said condenser, and means for connecting the unit to be tested in parallel with the condenser whereby the voltage applied to the unit will be gradually increased until breakdown occurs.

GEORGE H. BRODIE.